United States Patent [19]

Hamersma et al.

[11] Patent Number: 5,354,620
[45] Date of Patent: * Oct. 11, 1994

[54] POLYMER MIXTURE BASED ON A POLYALKYLENEPHTHALATE ESTER

[75] Inventors: Wilhelmus J. L. A. Hamersma, HE Bergen op Zoom, Netherlands; Roger W. Avakian, Brasschaat, Belgium

[73] Assignee: General Electric Co., Waterford, N.Y.

[ * ] Notice: The portion of the term of this patent subsequent to Jun. 19, 2007 has been disclaimed.

[21] Appl. No.: 89,386

[22] Filed: Jul. 9, 1993

Related U.S. Application Data

[63] Continuation of Ser. No. 873,533, Apr. 22, 1992, abandoned, which is a continuation of Ser. No. 590,454, Sep. 26, 1990, abandoned, which is a continuation of Ser. No. 192,286, Jun. 14, 1988, abandoned.

[30] Foreign Application Priority Data

Aug. 26, 1986 [NL] Netherlands ............... 8602160

[51] Int. Cl.$^5$ ............................... B32B 27/08
[52] U.S. Cl. ........................ 428/483; 525/175
[58] Field of Search ........................... 428/483

[56] References Cited

U.S. PATENT DOCUMENTS

| 3,585,160 | 6/1971 | Miller | 525/175 |
| 4,496,674 | 1/1985 | Ehrhart | 523/500 |
| 4,592,961 | 6/1986 | Ehrreich | 428/480 |
| 4,935,309 | 6/1990 | Krieg | 525/92 |

FOREIGN PATENT DOCUMENTS

| 0121883 | 10/1984 | European Pat. Off. . |
| 0146965 | 7/1985 | European Pat. Off. . |
| 2076832 | 12/1981 | United Kingdom . |

OTHER PUBLICATIONS

Hach's Chemical Dictionary 4th ed. p. 534 McGraw-Hill Book Company N.Y. (1969).
Billmeyer, Textbook of Polymer Science, p. 258 John Wiley & Sons, Inc. N.Y. (1971).

*Primary Examiner*—Patricia A. Short

[57] ABSTRACT

The invention relates to polymer mixtures which comprise a polyalkylenephthalate ester and a cyclic imino ether functionalized polystyrene. Layers can be manufactured from these mixtures. Said layers show a good bonding to layers of polystyrene.

5 Claims, No Drawings

POLYMER MIXTURE BASED ON A POLYALKYLENEPHTHALATE ESTER

This is a continuation of Ser. No. 07/873,533, filed on Apr. 22, 1992, now abandoned, which is a continuation of Ser. No. 07/590,454 filed on Sep. 26, 1990, now abandoned, which is a continuation of Ser. No. 07/192,286, filed on Jun. 14, 1988, also abandoned.

The invention relates to a polymer mixture based on a polyalkylenephthalate ester and a functionalized polystyrene.

Polymer mixtures based on polyalkylenephthalate ester are generally known. Such mixtures are generally used for the injection moulding of articles.

Polyethylene terephthalate based polyester compositions comprising a styrene-maleic acid anhydride copolymer are known from GB-A-2076832. Said compositions are claimed to have good adhesive properties.

The invention provides a new polymer mixture based on a polyalkylenephthalate ester which is particularly suitable to manufacture therefrom a layer which may be used in multilayer structures. The polymer mixture according to the invention is particularly suitable to manufacture therefrom a layer which readily adheres—without the intermediary of special bonding layers—to layers built up from polystyrene or modified polystyrene.

The polymer mixtures according to the invention moreover have better flow properties than pure polyalkylenephthalate esters. In addition, plates or foils from the polymer mixtures according to the invention have a good thermal deformability. Moreover, these plates can well be printed.

Of course it is not necessary to manufacture a layer from the polymer mixture according to the invention in a separate step. It is possible to manufacture a structure built up from several layers while using the polymer mixture according to the invention, for example, by co-extrusion.

The polymer mixture according to the invention comprises 1-99, preferably 50-90, % by weight of polyalkylenephthalate ester and 99-1, preferably 50-10, by weight of a functionalized polystyrene compound, the indicated quantities by weight being calculated with respect to the sum of the parts by weight of polyalkylenephthalate ester and functionalized polystyrene.

The polymer mixture according to the invention is characterized in that the functionalized polystyrene comprises as functional group one or more pendant cyclic imino ether groups.

As will be demonstrated hereinafter by means of comparative tests, the invention permits obtaining layers which have a better bonding to a polystyrene layer than layers prepared from a pure polyalkylene-phthalate ester.

The polymer mixture according to the invention comprises at least:
A. polyalkylenephthalate ester and
B. functionalized polystyrene.

A. Polyalkylenephthalate

The polymer mixture according to the invention comprises one or more polyalkylenephthalate esters. Polyalkylenephthalate esters are to be understood to mean the condensation products of one or more diol compounds and one or more phthalic acids. Suitable diol compounds are, for example, ethanediol, butanediol, hexanediol, cyclohexanedimethanol, diethylene glycol, triethylene glycol and ether diol compounds of the general formula $H-O-[(CH_2)_n-O]-_mH$. Suitable phthalic acids are terephthalic acid and isophthalic acid.

In the polyalkylenephthalate esters used in the polymer mixtures according to the invention, up to 20 mol. % of the diol compound may be replaced by, for example, aromatic diol compounds and/or unsaturated diol compounds and/or tri-ol or tetra-ol compounds. Up to 20 mol. % of the phthalic acid may be replaced by other dicarboxylic acids, for example, aliphatic dicarboxylic acids, for example, adipic acid, 1,4-cyclohexanedicarboxylic acid.

Particularly suitable for the polymer mixtures according to the invention are the polyalkylenephthalate esters the alkylene units of which are derived for more than 80 mol. % from 1,4-butanediol and the phthalate units of which are derived for more than 80 mol. % from terephthalic acid. It is possible as such to use a poly-butyleneterephthalate having an intrinsic viscosity of less than 1.5 parts/g. Polybutyleneterephthalate esters having an intrinsic viscosity from 0.7 to 2.0, preferably from 0.7-1.5 parts/g (measured in a 60/40 mixture of phenol/tetrachloroethane at 25° C.) are suitable.

Copolyesters derived from a diol consisting of 1,4-cyclohexanedimethanol and/or ethyleneglycol and from a phthalic acid consisting of terephthalic acid or a mixture of isophthalic acid and terephthalic acid are also suitable.

It is furthermore possible to use a mixture of two or more polyalkylenephthalate esters.

B. Functionalized polystyrene compound

The polymer mixture according to the invention comprises at any rate one or more functionalized polystyrene compounds as the second constituent.

Functionalized polystyrene is to be understood to mean polymers which comprise units derived from styrene or styrene derivatives and have one or more pendant cyclic imino ether groups.

Polystyrenes comprising pendant cyclic imino ether groups are known in the art. Reference may be made to EP-A-0205145. Such polymers can be obtained by the polymerization of a monomer mixture comprising styrene and an ethylenically unsaturated monomer containing a cyclic imino ether group, Preferably such monomer is a 2-alkenyl-2-oxazoline like 2-isopropenyl-2-oxazoline. The functionalized polystyrene comprises by preference 0.1-10 weight percent of the functional groups.

In addition to the above-mentioned constituents the polymer mixture according to the invention may comprise further constituents generally used in mixtures based on polyalkylenephthalate esters. Examples of such further constituents are agents to improve the impact strength, inert fillers, reinforcing fibres, agents to improve the flame-retarding properties, pigments and dyes, mould-release agents, stabilizers, processing aids, plasticisers.

The polymer mixture according to the invention can be obtained according to the conventional methods of preparing polymer mixtures based on thermoplasts. The polymer mixture according to the invention can be prepared by the collective extrusion of the individual constituents in an extruder. The resulting extrudate is then chopped to form pellets. It is possible to manufacture a layer or a film from the resulting pellets by melt extrusion. This layer may be bonded to a polystyrene layer. It is also possible to co-extrude the pellets to form a laminate in a machine which is suitable for coextrusion.

It is also possible to transfer the individual constituents of the polymer mixture according to the invention to an extruder or coextruder which has a gap-shaped extrusion head. In this case, a film or foil of the polymer mixture according to the invention is directly obtained.

The invention will be described in greater detail with reference to the ensuing specific examples.

In the examples, polymer mixtures were used which had been prepared as follows: the polyalkylenephthalate ester together with the indicated functionalized polystyrene compound was extruded in an extruder and chopped to form pellets. The extruder had been adjusted at a temperature of approximately 250° C. (250 rpm).

In the manner described hereinafter in Example I and Example II, laminates were manufactured from the resulting pellets of the polymer mixture according to the invention. The laminates always consisted of two layers: one layer of high-impact polystyrene and one layer of a pure polyalkylenephthalate ester or of a polymer mixture according to the invention.

EXAMPLE I

Several different layers were manufactured having a composition as indicated hereinafter (Table A). The layers were prepared by compressing the materials in a mould (dimension of the compressed layers: 180×50×0.65mm). The materials were first heated in the mould to just above their softening point and were kept at that temperature for 30 seconds. The material was then brought under a pressure of 25 kN for two minutes. The layers were then cooled in air.

TABLE A

| Layer no. | Composition (% by weight) |
|---|---|
| 1 | High-impact polystyrene (with 9.5% by weight of rubber and 20–25% by weight of gel fraction). |
| 2 | Polybutyleneterephthalate (PBT) (intrinsic viscosity 1.18 parts/g. |
| 3 | 80% by weight of PBT + 20% by weight of high-impact polystyrene. |
| 4 | 80% by weight of PBT + 20% by weight of polystyrene functionalized with oxazoline. |

Various structures, each consisting of one layer 1 and one of the layers 2 to 6 were manufactured from the resulting layers.

The structures were manufactured by pressing the layers one on top of the other under a pressure of 25 kN for 2 minutes at 250° C.

The mutual bonding strength of the layers in the resulting two-layer structures was determined as follows. The two layers were separated from each other mechanically (by means of a knife) over a length of 40 mm. The resulting ends were each bent at an angle of approximately 90° with the two-layer structure and clamped in a drawing machine. The layers were pulled apart at a drawing rate of 5 mm/minute. The force occurring when the two layers detached (fracture) was determined. The values found are recorded in Table B.

TABLE B

| Structure built up from layer Nos. | Force when the layers detached (N) |
|---|---|
| 2 & 1* | 4 |
| 3 & 1* | 1.3 |
| 4 & 1 | 12.8 |

*comparative example

It may be seen from the results of Table B that it is possible with the polymer mixtures according to the invention (used in the layer 4) to obtain a laminate having a good bonding between the various layers.

We claim:

1. A laminate comprising: a layer of polystyrene; and a layer of polyalkylenephthalate ester and polystyrene functionalized by a pendent cyclic imino ether group.

2. A laminate as in claim 1 further comprising at least one additional layer.

3. A laminate as in claim 2 wherein said polystyrene is high impact polystyrene.

4. A laminate according to claim 1 wherein the layer of polyalkylenephthalate ester and functionalized polystyrene has been manufactured from a polymer mixture comprising 50–90% by weight of polyalkylenephthalate ester and 50–10% weight of a functionalized polystyrene compound, the indicated quantities by weight being calculated with respect to the sum of the parts by weight of the polyalkylenephthalate ester and functionalized polystyrene, wherein the functionalized polystyrene comprises as a functional group one or more pendant cyclic imino either groups, and wherein 80 mole percent or more of the alkylene units of the polyalkylenephthalate being derived from 1.4-butanediol and 80 mole percent or more of the phthalate units of the polyalkylenephthalate being derived from terephthalic acid whereby the layers are directly bonded together without intermediary bonding layer.

5. An improved film or foil manufactured from a polymer mixture comprising 50–90% by weight of polyalkylenephthalate ester and 50–10% by weight of a functionalized polystyrene compound, the indicated quantities by weight being calculated with respect to the sum of the parts by weight of the polyalkylenephthalate ester and functionalized polystyrene, wherein the improvement comprises the functionalized polystyrene comprising as a functional group 0.1 to 10 weight percent reactive oxazoline group, 80 mole percent or more of the alkylene units of the polyalkylenephthalate being derived from 1.4-butanediol, 80 mole percent or more of the phthalate units of the polyalkylenephthalate being derived from terephthalic acid and which film or foil is bonded to a polystyrene film or foil.

* * * * *